US008799774B2

(12) United States Patent
Chafy et al.

(10) Patent No.: US 8,799,774 B2
(45) Date of Patent: Aug. 5, 2014

(54) TRANSLATABLE ANNOTATED PRESENTATION OF A COMPUTER PROGRAM OPERATION

(75) Inventors: Carl Randall Chafy, Ottawa (CA); Mario Francois Daigle, Ottawa (CA); Craig Allen Statchuk, North Gower (CA); Wayne Robert Stevens, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 12/899,628

(22) Filed: Oct. 7, 2010

(65) Prior Publication Data

US 2012/0089905 A1    Apr. 12, 2012

(51) Int. Cl.
*G06F 17/00* (2006.01)
*G06F 17/20* (2006.01)
*G06F 17/28* (2006.01)

(52) U.S. Cl.
USPC ............ 715/254; 715/202; 715/203; 715/233

(58) Field of Classification Search
CPC ............... G06F 17/241; G06F 17/289; G06F 17/30746; G06F 17/30796; G06F 17/30817
USPC ................................ 715/203, 254
See application file for complete search history.

(56) References Cited

U.S. PATENT DOCUMENTS

| | | | |
|---|---|---|---|
| 7,054,804 B2 | 5/2006 | Gonzales et al. | |
| 7,216,298 B1 * | 5/2007 | Ballard et al. | 715/760 |
| 7,627,821 B2 * | 12/2009 | Klementiev | 715/704 |
| 7,653,896 B2 * | 1/2010 | Herdeg, III | 715/704 |
| 8,423,164 B2 * | 4/2013 | Jaeger | 715/203 |
| 2003/0065503 A1 | 4/2003 | Agnihotri et al. | |
| 2003/0164850 A1 * | 9/2003 | Rojewski et al. | 345/733 |
| 2004/0046792 A1 * | 3/2004 | Coste et al. | 345/763 |
| 2005/0192095 A1 | 9/2005 | Cheng | |
| 2007/0203900 A1 * | 8/2007 | Lu | 707/4 |
| 2008/0066138 A1 | 3/2008 | Bishop et al. | |
| 2008/0133216 A1 * | 6/2008 | Togami | 704/4 |
| 2008/0297657 A1 | 12/2008 | Griffiths et al. | |
| 2009/0132920 A1 * | 5/2009 | Deyo et al. | 715/708 |
| 2009/0300475 A1 * | 12/2009 | Fink et al. | 715/230 |
| 2010/0118189 A1 | 5/2010 | Ayoub et al. | |
| 2010/0125802 A1 * | 5/2010 | Huslak et al. | 715/760 |
| 2010/0138209 A1 | 6/2010 | Harrenstien et al. | |
| 2010/0174992 A1 * | 7/2010 | Portman et al. | 715/738 |

OTHER PUBLICATIONS

Morgan, "Automation Series Part Two: JitBit Macro Recorder and getting started," Mar. 1, 2010, wallofmonitors.com, pp. 1-5.*
Shynet, "Mouse Recorder Pro 2.0.5.0 has been released!," Jul. 29, 2010, byshynet.com, pp. 1-4.*

* cited by examiner

*Primary Examiner* — Doug Hutton, Jr.
*Assistant Examiner* — Ariel Mercado
(74) *Attorney, Agent, or Firm* — James L. Baudino

(57) ABSTRACT

Embodiments of the disclosure relate to generating a translatable and annotated multimedia or video presentation of a software program operation. An aspect of the disclosure comprises recording user interaction data that includes user interface gestures and text entries from a keyboard and other user devices while the program is operating. Embodiments of the disclosure transform recorded text and visual contents of the program to a selected format or language, annotate contents of interest, and merge recorded user interface gestures, transformed text and visual contents, and transformed annotations into the output presentation. The embodiments of the disclosure optionally generate an accessibility script in a selected format.

21 Claims, 9 Drawing Sheets

TRANSLATABLE ANNOTATED PRESENTATION OF A COMPUTER PROGRAM OPERATION

BACKGROUND

Embodiments of the disclosure relate generally to computer software, and more particularly, to generating a presentation of a software operation for demonstration purposes.

Software demonstrations are essential marketing and training tools for illustrating the capabilities a software product to potential customers and users. Showing "live" examples the product functions and features is an effective method for understanding the operation of a software application and learning how to use it. A software demonstration typically includes visual contents generated and displayed during the operation of the software, such as data processed by the application, user interface activities and input-output data. In addition, a product demonstration often integrates program data with other information sources like Web contents, document libraries, and multimedia repositories. As a result, software demonstrations often incorporate various text formats, graphics, images, videos and sound. They are commonly available in a video format to facilitate their distribution and broaden their appeal to potential viewers.

A software demonstration video is relatively more costly to produce than text, Web contents, and other traditional media formats as video production typically requires specialized equipment and the skills of video production professionals. In addition, a video is more difficult to localize and translate to another format such as a foreign language. This adds significant costs to the production of a video if it is desirable to have the same presentation customized with local features or in other languages. Further, it is generally time-consuming to provide accessibility support in a video presentation for people with disabilities, which further adds to its production costs. Producing an effective video demonstration of a software application thus often exceeds the budget and schedule constraints of a typical user or product developer.

There are utilities in the market for producing demonstration videos of software applications which typically capture visual screen contents from the target applications and produce videos of the screen contents. These utilities generally do not allow a video output to be readily transformed into another format such as a foreign language.

There is a need in the art for a system and method for generating a multimedia or video presentation of a program operation without the aforementioned drawbacks.

BRIEF SUMMARY

Exemplary embodiments of the disclosure relate to generating a multimedia or video presentation of a software operation that may be transformed to other formats or languages. One aspect of the disclosure concerns a system for generating a multimedia presentation of a program operation. The system may comprise a recorder for recording user interaction data while the program is operating. User interaction data may include user interface gestures and text generated by a keyboard or other user interface devices. The system may further comprise a transformer for transforming the recorded text to a selected format, and a presentation generator for merging the transformed text, recorded user interface gestures, and visual contents from the program operation into the output presentation in the selected format.

Another aspect of the disclosure concerns a method for generating a multimedia or video presentation of a program operation. The method records user interaction data while the program is operating and transforms the recorded text to a selected format. User interaction data may include interface gestures and text entries from a keyboard or other user interface devices. The process merges transformed text, recorded user interface gestures, and visual contents from the program operation into an output presentation in the selected format. The selected format may be in a foreign language, with annotations, and may have accessibility support for people with disabilities.

Still another aspect of the disclosure concerns a computer program product for generating a multimedia or video presentation of a program operation. The computer program product comprises a computer readable storage medium having computer readable program code embodied therewith and configured to record user interface data while the program is operating. User interface data may include user interface gestures and text. The computer program product may comprise computer readable program code configured to transform the recorded text and visual contents from the program operation to a selected format. The computer program product may further comprise computer readable program code configured to merge the transformed text, transformed visual contents, and recorded user interface gestures to generate the presentation in the selected format.

The details of the preferred embodiments of the disclosure, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION

Figure 1:
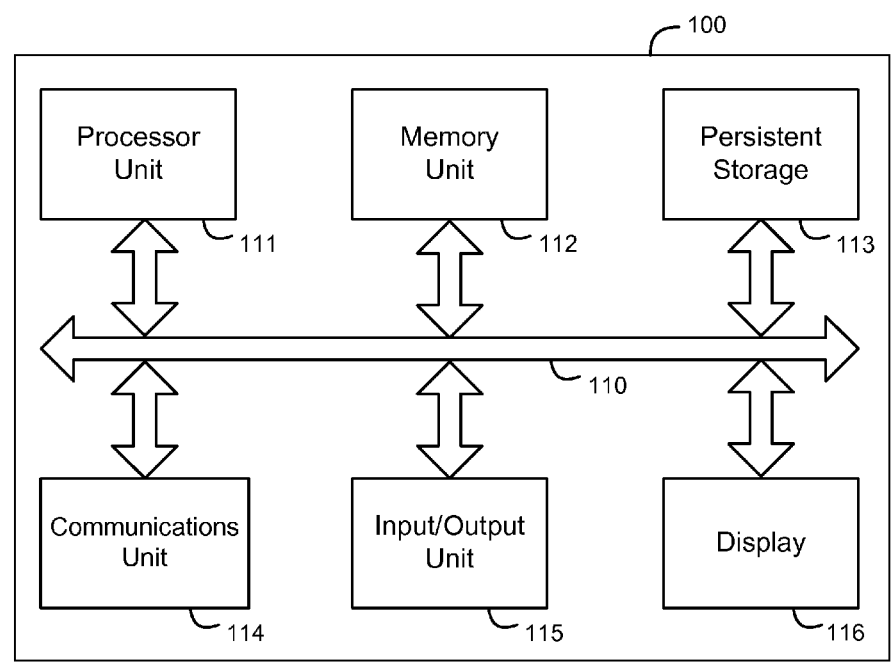
FIG. 1 illustrates an exemplary block diagram of components of a representative computer in which aspects of the disclosure may be provided.

As will be appreciated by one skilled in the art, aspects of the disclosure may be embodied as a method, system or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the disclosure relate to producing a presentation of a software application to demonstrate the operation and functions of the application, for example, to potential customers and users. In addition to product marketing applications, a company may use such a presentation for training and product support purposes. The presentation is preferably in a video format, but may be in other multimedia forms. The embodiments separately record user interface gestures and transformable components of a program during operation and transform these components to a target language or format. The transformed components of the program operation may include keyboard entry text and output text generated by the program, annotation text associated with areas of user interest and visual contents that the program produces during the operation. Once these components are transformed to a target format or language, embodiments of the disclosure combine them to generate an output presentation. The embodiments of the disclosure may further generate a transformed accessibility script from the transformed and annotated presentation for users with hearing or other disabilities.

Referring to FIG. 1, there is illustrated a block diagram of components in a representative computer in which aspects of the disclosure may be implemented. Data processing system 100 includes a processor unit 111, a memory unit 112, a persistent storage 113, a communications unit 114, an input/output unit 115, a display 116, and system bus 110. Computer programs are typically stored in persistent storage 113 until they are needed for execution, at which time the programs are brought into memory unit 112 so that they can be directly accessed by processor unit 111. Processor 111 selects a part of memory 112 to read and/or write by using an address processor 111 gives to memory 112 along with a request to read and/or write. Usually, the reading and interpretation of an encoded instruction at an address causes processor 111 to fetch a subsequent instruction, either at a subsequent address or some other address.

Figure 2:
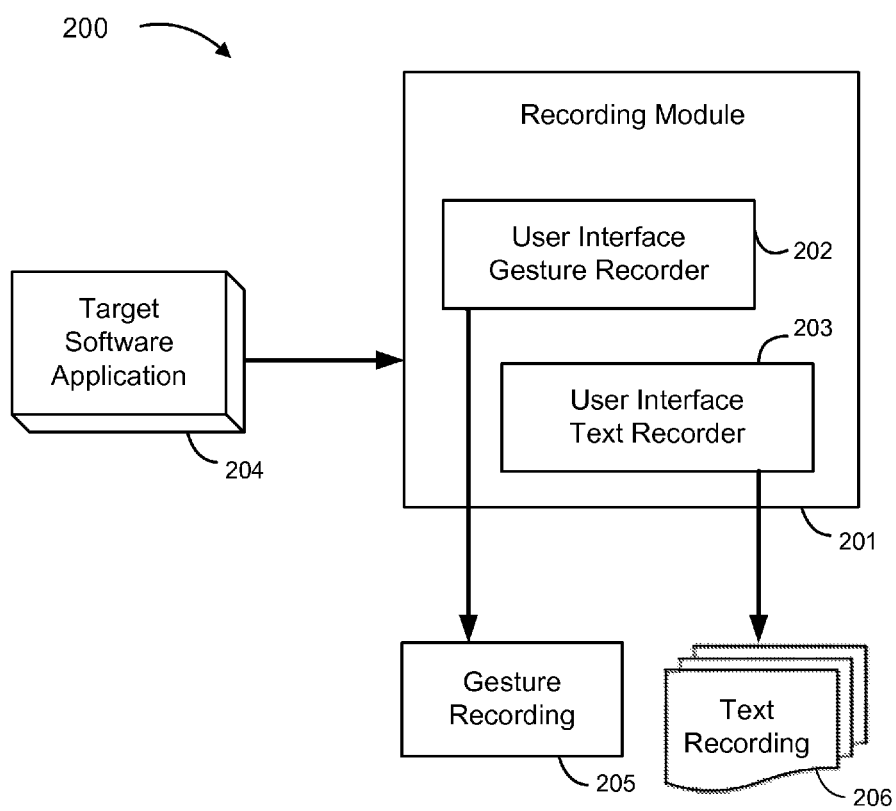
FIG. 2 illustrates a block diagram of a recording system for capturing user interface gestures and user interface text during the operation of a software program, according to an exemplary embodiment of the disclosure.

FIG. 2 illustrates a block diagram of a recording system 200 for capturing user interface gestures and user interface text entries during the operation of a software program, according to an exemplary embodiment of the disclosure. The recording system 200 may execute as a separate process to monitor input activity in a target software application 204, and may comprise a recording module 201 for capturing user interface data from the target application 204. The target application 204 is generally a software product, but may be other types of computer-related products that comprise software components. The target application 204 may be compiled or assembled with additional interface components that forward user interface activity to the recording system 200. Computer display screen, resource or dialog identifiers associated with the target application 204 commonly indicate components in the application 204 that may have user interface control.

In the illustrated embodiment, the recording module 201 may be a keyboard activity logging component logically coupled between the target application 204 and a host operating system (not shown) that executes the target application 204. The recording module 201 captures user input and may store the captured input in a log file for a playback execution of the target application. The recording module 201 may separate user interaction data from the target program 204 into user interface gestures and user interface text to facilitate a transformation or a translation of the program operation. User interface gestures include user activities such as mouse movements, selections of user menu options, and activations by the user in response to functions provided by a user interface device. User interface text entries may include keyboard entries as well as text entered or selected from other input devices such as a stylus, keypads, and finger presses.

Gesture recorder 202 of the recording module 201 may capture the user interface gestures and store them in a gesture recording 205. The gesture recording 205 is a log file that will be used to synchronize keyboard input with the execution of target software application 204 during a subsequent playback of the program operation. The gesture recording 205 includes input elements of the target application 204, such as a screen or dialog resource signature. The gesture recorder 202 may employ character recognition and object resource identification to disambiguate a software element being displayed. The gesture recorder 202 may further capture a time code that indicates a relative time offset of when an activity is recorded so that keyboard activity will be played back in a correct sequence.

The recording module 201 may comprise a user interface text recorder 203 for capturing user interface text entries, which may be stored in a text recording 206. The user interface text recorder 203 may record keystrokes in the text recording 206 along with the type of input field. Keystrokes used for navigation (for example, up and down arrows) are distinguished from those used for text field input (for example, keystrokes directed toward a text input box). Typically, text box input will be translated in a subsequent step while navigation keystrokes may not be translated. The text recording 206 may be in any format, such as XML or a similar markup language.

Figure 3:
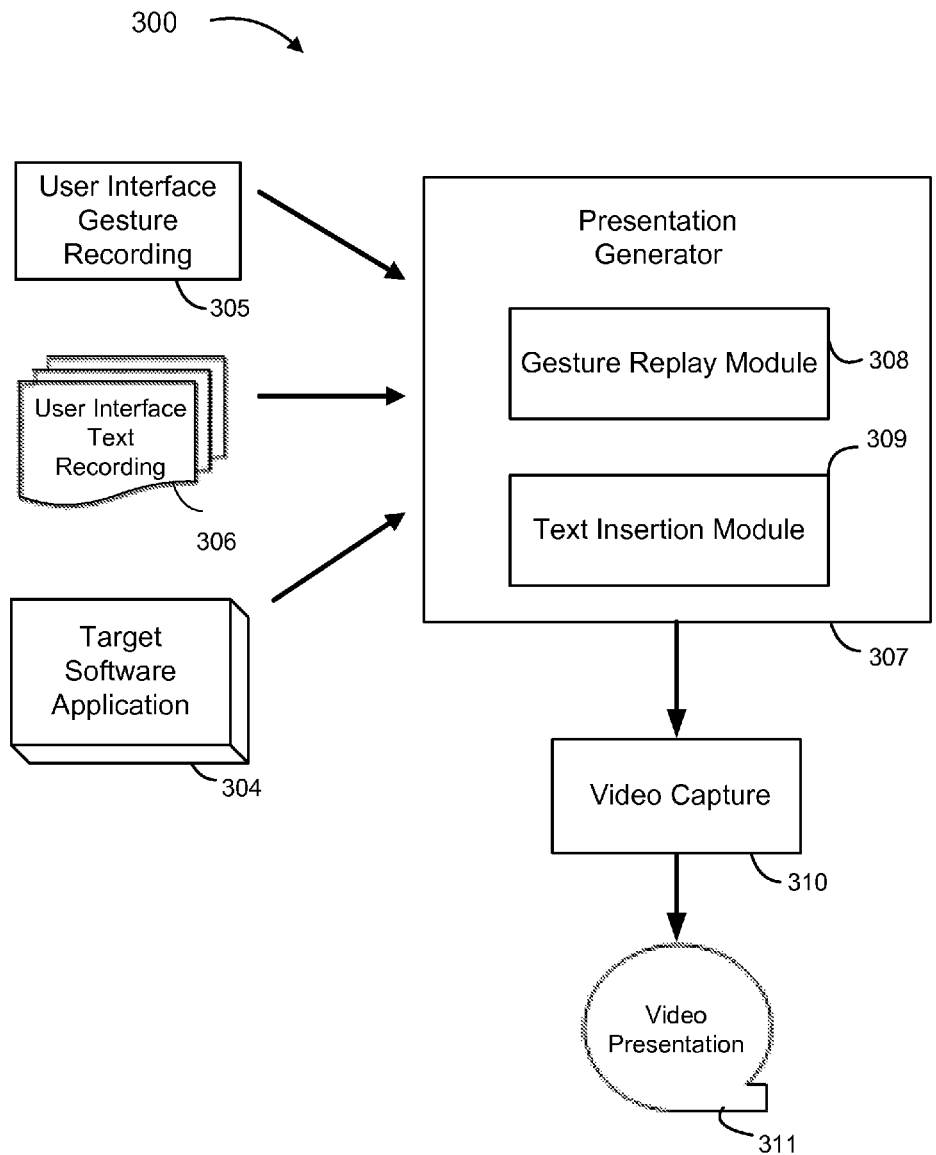
FIG. 3 illustrates a block diagram of a system for generating a video presentation from captured user interface gestures and text input during the operation of a software program, according to an exemplary embodiment of the disclosure.

FIG. 3 illustrates a block diagram of a system 300 for generating a video presentation from captured user interface gestures and user interface text during the operation of a software program, according to an exemplary embodiment of the disclosure. System 300 includes a presentation generator 307 for combining gesture recording 305, recorded user interface text 306 and visual contents generated during the operation of target software application 304 to produce an output presentation. As illustrated in FIG. 2, gesture recording 305 and user interface text recording 306 were respectively generated by gesture recorder 202 and text entry recorder 203. The presentation generator 307 combines user interface gestures, including mouse and pointer activities, and keyboard character input. In one embodiment, the presentation generator 307 may comprise components used for performing automated testing of graphical user interface (GUI) software components, such as the IBM Rational Functional Tester™.

In another embodiment, the presentation generator 307 may comprise a gesture replay module 308 and a text insertion module 309. As target software 304 is operating, gesture replay module 308 recreates, based on gesture recording 305, user interface gestures made during the program operation and transformed in some manner as described with reference to FIGS. 6 and 7. Gesture replay module 308 replays user interface activities like mouse movements and interface device activations to control the target application 304 so that the application 304 performs the same operations that were previously demonstrated. The gesture replay module 308 reproduces mouse movements and interface device activations by reading the user interface gesture recording 305.

In addition, text insertion module 309 may add text captured from a keyboard and other interface devices during the program execution based on input text recording 306. Text insertion module 309 may show text, graphic elements, and other multimedia data in a separate logical layer that is presented in front of all rendered video contents. The user interface text recording 306 may contain the actual text to be overlayed with other visual contents of the program execution. This file may also control the insertion and playback of keyboard text.

The output of the presentation system 300 is a multimedia stream of the merged contents that faithfully represents the visual demonstration of target software application 204 performed in FIG. 2. The system 300 may further comprise a video capture module 310 for integrating all the data streams and video layers generated by presentation generator 307 and creating a standalone video presentation 311. The video capture component 310 may be logically coupled between the presentation generator 307 and the operating system display drivers or devices. An example of the video capture component 310 is the Camtasia Studio™ program. The output video presentation 311 may be stored in any desired video format, and then played back using an appropriate software or standalone player device to demonstrate the operation of the target software application.

Figure 4:
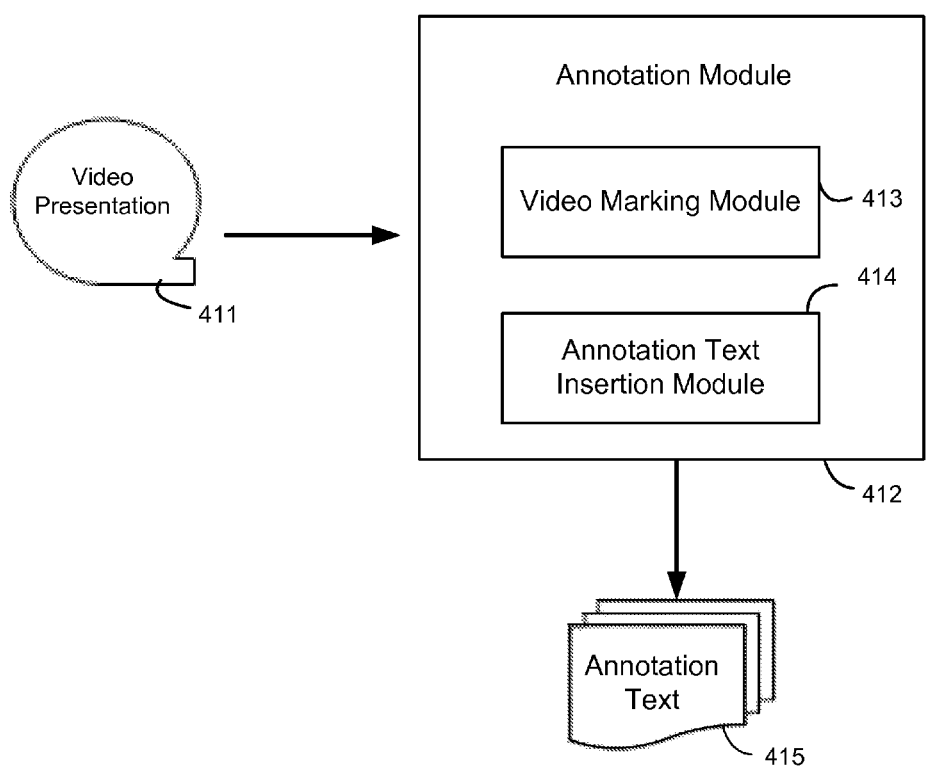
FIG. 4 illustrates a block diagram of an annotation module for generating annotation text from a transformed presentation, according to an exemplary embodiment of the disclosure.

FIG. 4 illustrates a block diagram of an annotation module 412 for generating annotation text from a transformed presentation according to an exemplary embodiment of the disclosure. The annotation allows text inserts, overlays, pop-ups, or 'bubble' text over the video captured in FIG. 3. A resulting annotation text file 415 may contain text and other parameters that specify text position and layout within the video presentation 311. The annotation text file 415 may be in any data format, such as XML, and the text may be in any installed text font.

The annotation module 412 may add annotation text in boxes containing text strings that the user composes from a keyboard. The annotation text may be attached to data either in a box that is visible or invisible in the video area. While recording a video presentation, the annotation process allows text to be added on top of the video. A presentation author may add free-form text annotations anywhere in the video to help explain data or bring attention to specific points in data sets. An example of an annotation text utility is the Camtasia Studio™ program.

Annotation module 412 may comprise a video marking module 413 for associating instances of annotation text with time codes or other appropriate time markers in video presentation 411, which was generated by presentation generator 307 in FIG. 3. Based on the time codes recorded by video marking module 413, annotation text will appear or disappear at appropriate time during a video playback as described with reference to FIG. 5. Annotation text may include text highlighting areas in the presentation that might be of interest to the audience, such as complex transactions and contact information. Annotation module 412 may further include an annotation text insertion module 414 for allowing a user to compose and edit annotations in the form of text, graphic elements or other types of multimedia data that are associated with time markers established by video marking module 413. The annotation module 412 may generate annotation text output 415 using video presentation 411, time markers from video marking module 413, and annotations from text insertion module 414.

Figure 5:
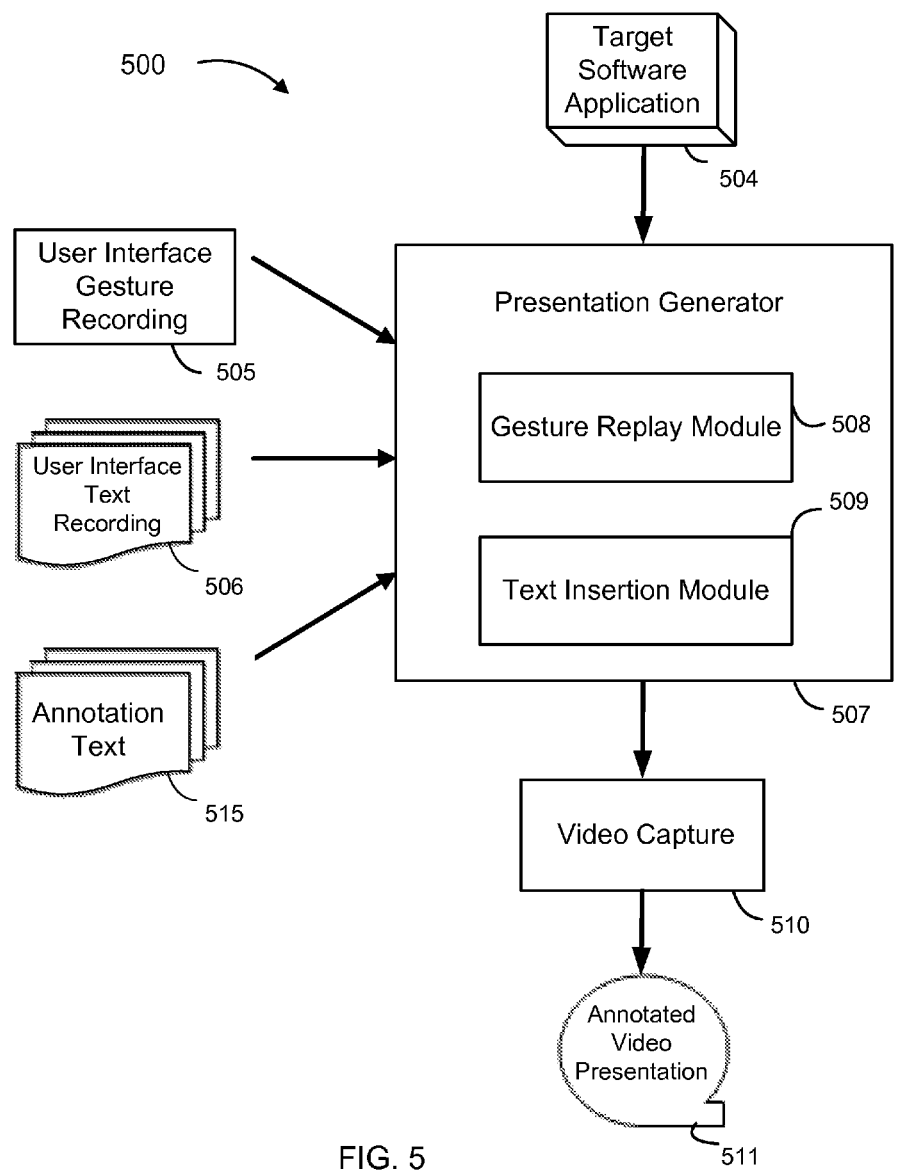
FIG. 5 illustrates a block diagram of a system for generating an annotated video presentation from annotation text, recorded user interface gestures and text entries during the operation of a software program, according to an exemplary embodiment of the disclosure.

FIG. 5 illustrates a block diagram of a system 500 for generating an annotated video presentation from annotation text, recorded user interface gestures and text entries during the operation of a software program, according to an exemplary embodiment of the disclosure. System 500 may include a presentation generator 507 for combining gesture recording 505 and text entry recording 506 captured while program 504 is operating, and annotation text 515, to create an annotated presentation of the program operation. As described with reference to FIG. 3, while target software 504 is running, gesture replay module 508 of presentation generator 507 recreates the user interface gestures made during the program operation based on the gesture recording 505. In addition, text insertion module 509 may add text captured from keyboard and other user interface devices during the execution, based on text recording 506. Text insertion module 509 may further add annotation text 515 to the presentation at appropriate time markers previously designated by video marking module 413.

In one embodiment of the disclosure, the annotation text may be superimposed over the presentation content. Presentation generator 507 may output a multimedia presentation containing the merged contents. Alternatively, system 500 may comprise a video capture module 510 that records the merged contents in a video format and generates an annotated video presentation 511. Overlay content may be displayed using any appropriate form of alpha-channel compositing which allows overlay content to be shown simultaneously with other video content.

Figure 6:
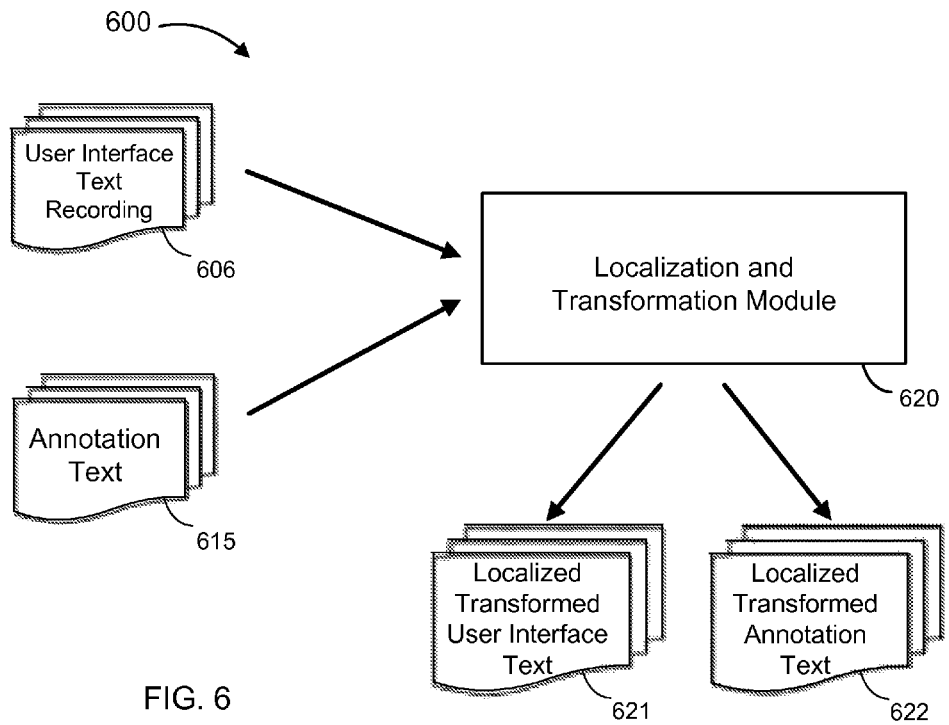
FIG. 6 illustrates a block diagram of a localization and transformation module for localizing a program, translating the program to a foreign language, and generating transformed user interface and annotation text for a program presentation, according to an exemplary embodiment of the disclosure.

FIG. 6 illustrates a block diagram of a localization and transformation module for localizing a software program, transforming the program, and generating transformed user interface text and annotation text for a program presentation, according to an exemplary embodiment of the disclosure. Localization and transformation module 620 may modify text recording 606, e.g., a recording of keyboard entries, to make the text compatible with local information such as time zones and regulations, or translates the text to a desired foreign language without changing the video contents or the target software itself. It may also personalize the text according to the needs of target viewers. Localization and transformation module 620 may further translate annotation text 615 to a desired language to create an instance of transformed annotation text 622 in this language.

The recording module 201 and annotation module 412 may respectively capture keyboard inputs for product navigation and annotation text and transfer them into a translation specific log file format, such as the Localization Interchange File Format (XLIFF). Text that needs to be translated may be identified with specific tags within the log files. These log files may be structured to be translated by integrating them with a translation tool such as the IBM TranslationManager™ program. The localization and translation component 620 may translate text identified in the log files using industry standard translation tools. In addition, the localization and translation component 620 may generate separate log files for each target language, as localized and transformed interface text 621 and localized and transformed annotation text 622. These log files 621-622 are identical to the original log files, except that the identified text is translated into a target language. The presentation generator 507 may use each translated log file to overlay the translated annotations onto the translated product to create a faithful reproduction of the demonstration video in a target language.

Figure 7:
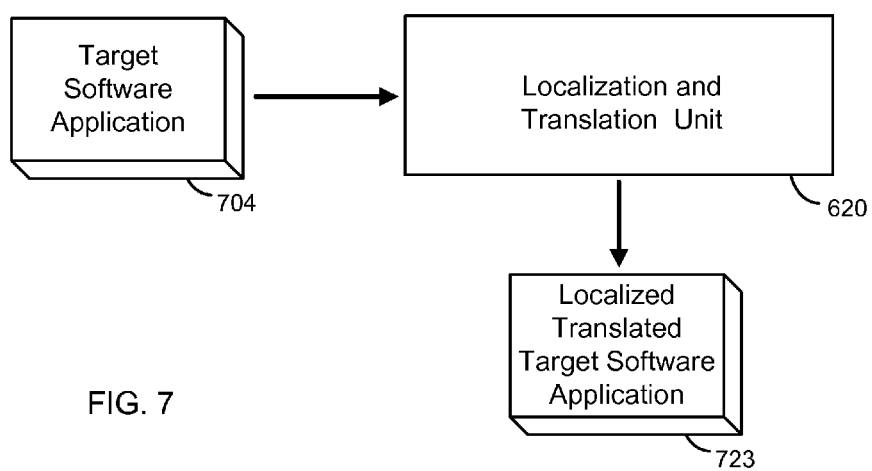
FIG. 7 illustrates a translation of a target software application by the localization and transformation module.

In another operation that may occur in parallel with the localization and translation of user interface text, the localization and transformation module 620 may localize and transform target software application 704 to create a transformed target software 723, as illustrated in FIG. 7. A software developer may transform target software 704 using any standard development tool that isolates user interface resources and separately transforms them into a customized form, such as a foreign language. All the user interface text of a target software application 704 may be externalized into a translation specific log file format such as the Localization Interchange File Format (XLIFF). The transformed user interface resources are then combined with the original target program components to produce the transformed target program 723.

Text that needs to be translated may be identified with specific tags within a log file. Log files may be structured to be translated by integrating with translation tools such as the IBM TranslationManager™ program. The localization and translation component 620 may translate text identified in the log files using industry standard translation tools. In addition, the localization and translation component 620 may generate separate log files for each target language. These log files are identical to the original log files, except that the identified text is translated into a target language. The resulting translated log files are used to create a translated product 723 in a different language.

Figure 8:
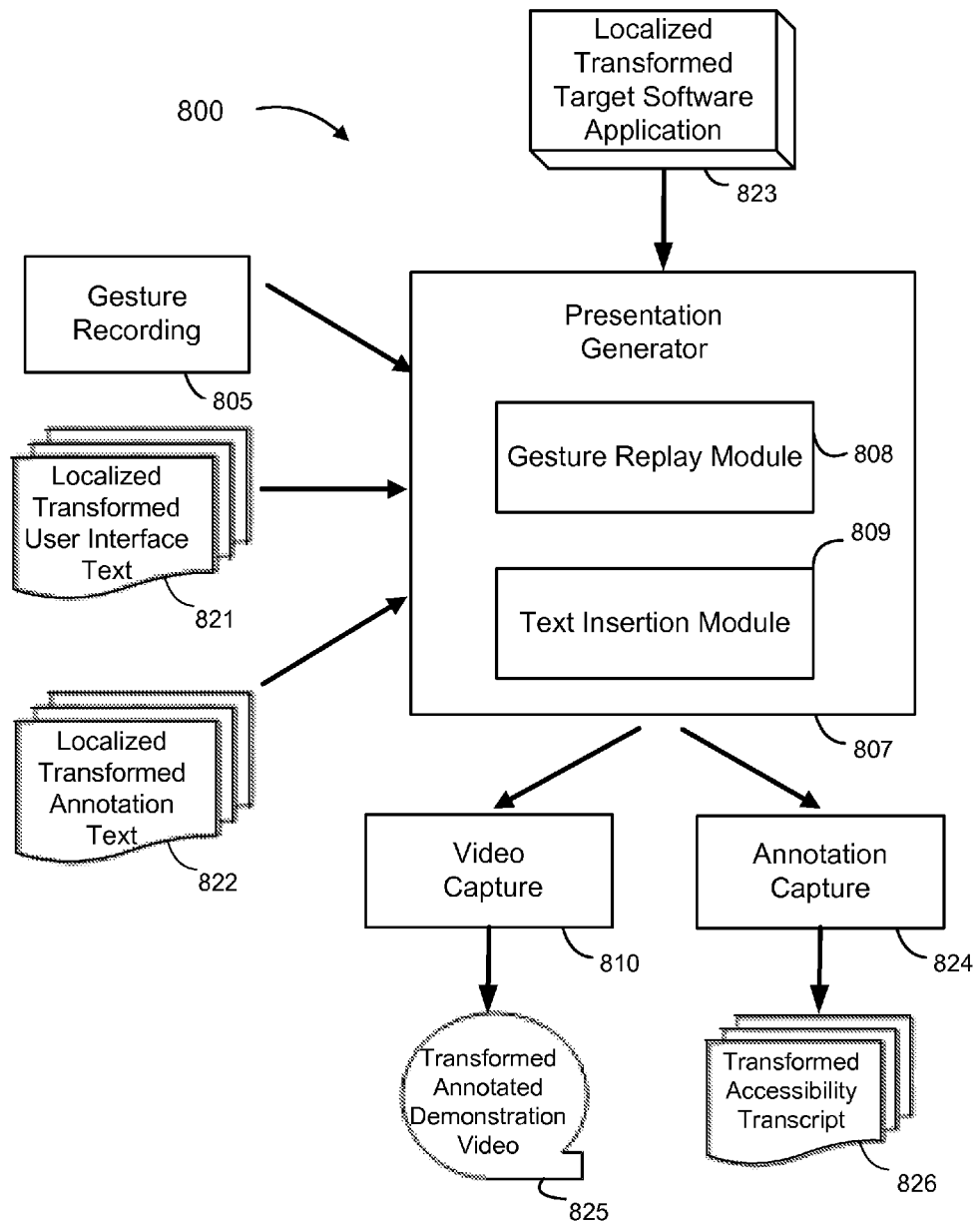
FIG. 8 illustrates a block diagram of a system for generating a transformed, annotated video presentation and transformed accessibility script from recorded user interface gestures and transformed text entries, according to an exemplary embodiment of the disclosure.

FIG. 8 illustrates a block diagram of a system 800 for generating a transformed and annotated video presentation, and a transformed accessibility script from user interface gestures and transformed user interface text captured during the operation of a program, according to an exemplary embodiment of the disclosure. System 800 comprises a presentation generator 807 for combining gesture recording 805, localized and transformed user interface text 821, and localized and transformed annotation text 822 associated with the operation of transformed target program 823 to create a transformed and annotated presentation. Localization and transformation module 620 generates the transformed text 821, transformed annotation text 822, and transformed target software 823 as described with reference to FIGS. 6-7.

While the localized and transformed target software 823 is operating, gesture replay module 808 of presentation generator 807 may recreate the user interface gestures made during the program operation from the gesture recording 805. Further, text insertion module 809 may add localized and transformed text version 821 of the text entries captured during the program execution to the presentation contents. Text insertion module 809 may further add localized and transformed annotation text 822 to the presentation at appropriate time markers designated by video marking module 413. Presentation generator 807 may output a transformed and annotated multimedia presentation containing the merged contents. Alternatively, system 800 may include a video capture module 810 that records the merged contents in a video format and generates a transformed and annotated video presentation 825. A product user or a potential customer can now view the transformed and annotated video presentation 825 in any desired language.

The presentation system 800 may further comprise an annotation capture module 824 for generating a transformed accessibility script 826 which describes activities in the transformed annotated video presentation 825 to persons with disabilities. The annotation capture module 824 may build a text description of user interface activities in the translated accessibility transcript 826. Such activities are described in gesture recording 505 and localized translated user interface text 821. This description of visual interface activity may include the type of movement or gesture, e.g., mouse movements, mouse clicks, and typing. It may also include source and target visual objects as applicable, e.g., text boxes, buttons, and hyperlinks, and input/output text, e.g., values shown or entered at a keyboard.

The annotation capture module 824 may store the accessibility script 826 in an appropriate accessible format such as Braille and audio description of video materials. The system 800 may further use character recognition and object resource identification to disambiguate the software element being displayed. A product user or customer with physical disabilities may then use the transformed accessibility transcript 826 to follow the transformed and annotated video presentation 825 in any desired language. The system 800 may further augment the translated accessibility transcript 826 with the localized translated annotation text 822. The annotation text 822 describes activities related to source and target visual objects as applicable and faithfully represents user interface activities from the original target application 804 presentation.

Figure 9:
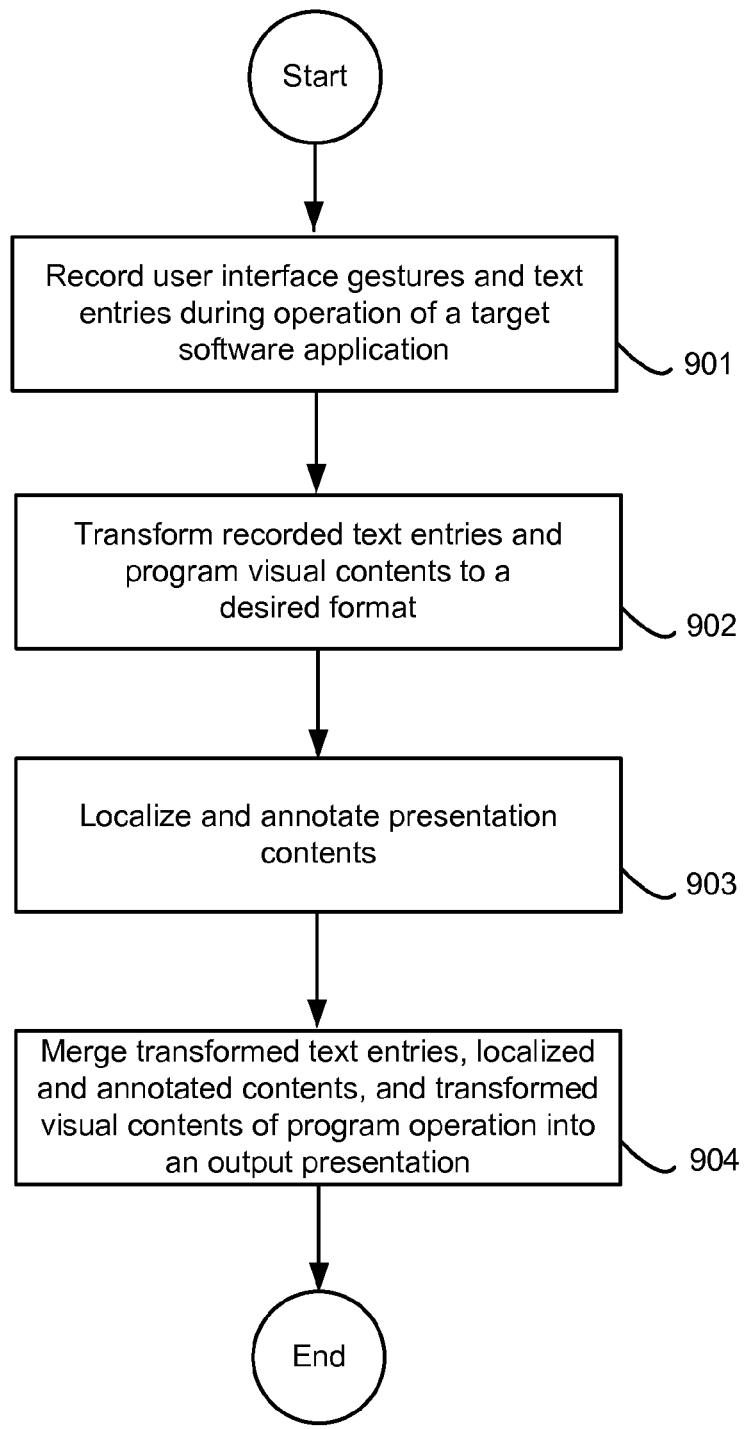
FIG. 9 is a flowchart of a high-level process for generating a translatable presentation of a software operation according to an exemplary embodiment of the disclosure.

FIG. 9 illustrates a flowchart of a high-level process for generating a translatable presentation of a target software operation according to an exemplary embodiment of the disclosure. At step 901, recording module 201 captures user interface gestures and interface text entries, such as entries from a keyboard or other user interface devices, while the target software is operating. The captured user interface gestures and text entries are respectively stored in gesture recording 205 and text recording 206. The illustrated exemplary process transforms recorded text entries and visual contents of the program operation into a desired format, such as a foreign language, at step 902. At step 903, the localization and transformation module 620 localizes contents of the presentation to make them compatible with the local environment such as time, date, physical location, regulations and other locality-specific characteristics.

In addition, the annotation module 412 may annotate areas in the presentation that may be of interest to a viewer or user at step 903. Examples of these annotations include text explaining a complex operation or guidance to users on specific subjects relating to the program. The presentation generator 807 merges transformed text entries, visual contents of the program operation that have been updated with local information, and annotation text into an output presentation on the program, at step 904. The presentation may be in a multimedia format that includes text, computer graphics, images, sound, and video. Alternatively, the presentation system may capture the merged information in a video presentation that includes sound narration and multimedia effects to increase its effectiveness and appeal to viewers.

Figure 10:
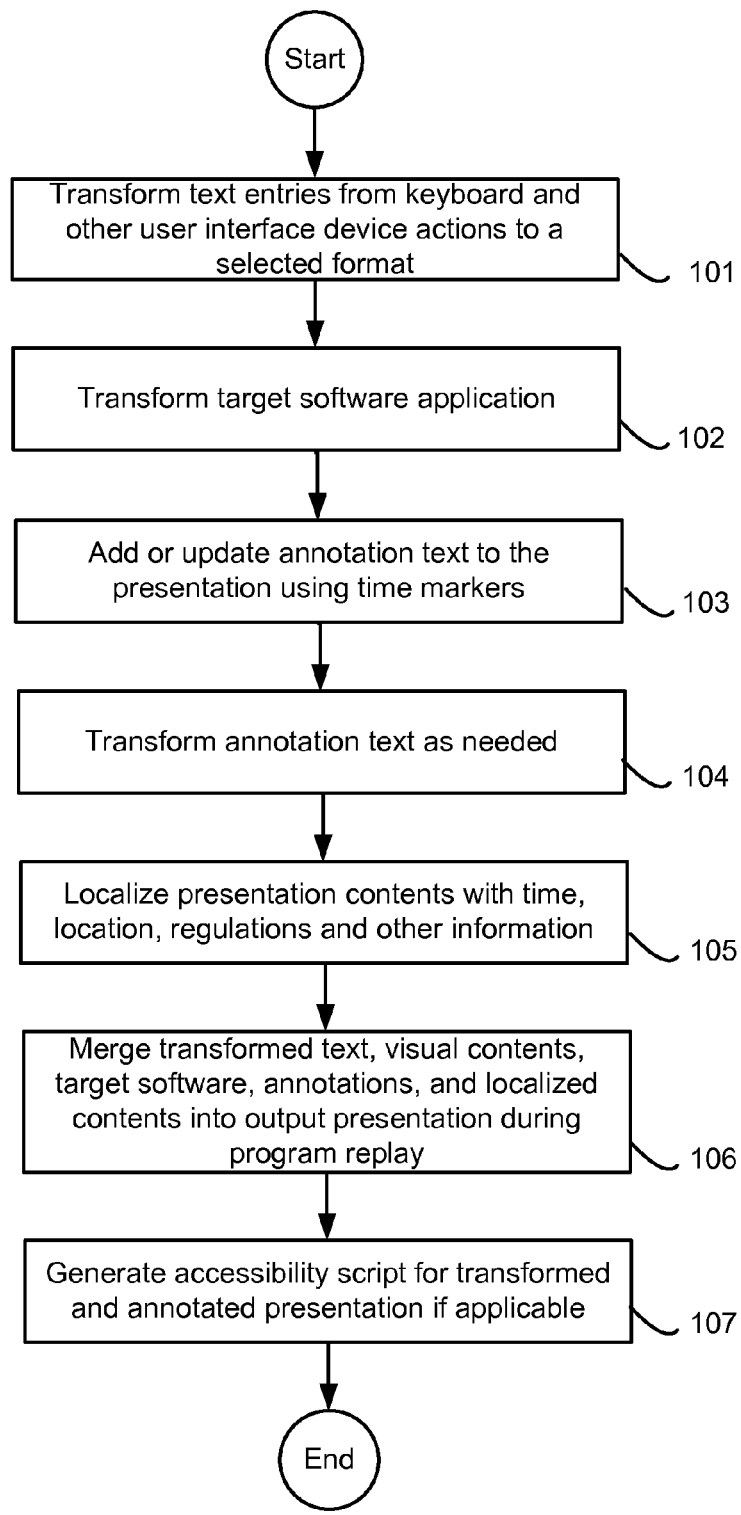
FIG. 10 is a flowchart of a process for a transforming, annotating, localizing, and generating an accessibility script for a presentation of a software program operation, according to an exemplary embodiment of the disclosure.

FIG. 10 illustrates a flowchart of a process for transforming, annotating, and localizing a presentation of a software application, and generating an accessibility script for the presentation, according to an exemplary embodiment of the disclosure. Once interface text entries such as those from a keyboard and other user devices are separated from other interface data per step 901, the localization and transformation module 620 transforms the text entries to a selected format or language in step 101. The selected format may have local characteristics used in program display, operation and control. It may further include customized presentation components like company logos and branding elements. At step 102, the author may also want to transform the target application 704 to the selected format or language. The transformation of the target software 704 could be accomplished using any standard development tool that isolates user interface resources and separately transforms them into a customized form, such as a foreign language. The development tool then combines the transformed user interface resources and the original target program components to produce the transformed target program 723.

The annotation module 412 may further add or update annotations relating to certain points in the presentation that may be of interest to users while viewing the presentation, at step 103, by associating them to established time markers. The annotations may concern key features and advantages of the software application, operations that are not easily understood by the viewers, and other items that the presentation author would like to bring to the attention of the viewers. The localization and transformation module 620 may further transform the annotation text to a selected format if desired, at step 104. At step 105, the localization and transformation module 620 updates contents in the presentation with local information like time zones, physical location, and government regulations. The presentation generator 807 merges the transformed text and visual contents generated during the program operation, annotations, transformed target program, and localized information into an output presentation, at step 106. This merging takes place while the program is operating.

As an additional output of the presentation production, the annotation capture module 824 may generate a transformed accessibility script 826 for viewers and users of the presentation who have physical disabilities, at step 107, based on the generated transformed and annotated presentation. The transformed accessibility script 826 describes program display and control operation to a person with disabilities like deafness or blindness in the desired language or transformed format. It is built from a collection of relevant user interface activity and text or other appropriate descriptions of the related actions.

The subject matter described above is provided by way of illustration only and should not be construed as limiting. Various modifications and substitutions of the described components and operations can be made by those skilled in the art without departing from the spirit and scope of the disclosure defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A system for generating a presentation of a program operation, comprising:
    a computer;
    a recorder coupled to the computer and comprising a user interface gesture capturing module and a user interface text capturing module, the user interface gesture capturing module recording user interface gestures in a gesture recording and the user interface text capturing module recording user interface text in a text recording while the program is operating, and the user interface text including input-output text and annotation text;
    a gesture replay module operable to, during a subsequent playback of the program, read the gesture recording and synchronize input to a user interface from the gesture recording with execution of the program to recreate the user interface gestures that were previously demonstrated when creating the gesture recording to control the program and cause the program to perform operations that were previously demonstrated when recording the user interface gestures;
    a text insertion module operable to, during the subsequent playback of the program, read the text recording and insert the previously recorded user interface text in a display with execution of the program;
    a localization and transformation module operable to localize and transform the subsequently played back program by transforming a user interface resource into a desired local form, the localization and transformation module further operable to modify the text recording to cause the inserted text to be compatible with the desired local form;
    an annotation capture module operable to generate a transformed accessibility script describing a user interface gesture of the gesture recording for a user with a disability; and
    a presentation generator for merging the gesture recording, the text recording, the inserted user interface text, the replayed user interface gestures, the modified text recording, and the accessibility script to generate the presentation.

2. The system of claim 1, wherein the recorder employs character recognition and object resource identification to distinguish input elements associated with the program.

3. The system of claim 1, wherein the recorder comprises a keyboard logging module coupled to the program and an operating system executing the program.

4. The system of claim 1, wherein the text insertion module displays the user interface text in a logical layer of the presentation.

5. The system of claim 1, wherein the presentation generator comprises a graphical user interface (GUI) software testing component.

6. The system of claim 1, further comprising a video capturing module for creating the presentation in a video format.

7. The system of claim 6, further comprising an operating system, and wherein the video capturing module is coupled to the presentation generator and the operating system.

8. The system of claim 1, further comprising an annotation marking module for synchronizing annotation text to a plurality of time markers in the presentation, and an annotation text insertion module for adding the annotation text to the presentation.

9. The system of claim 1, further comprising a transformer for transforming the annotation text to a selected format for inclusion in the presentation.

10. The system of claim 9, wherein the selected format is in a foreign language.

11. The system of claim 1, further comprising an annotation capturing module for generating a transformed accessibility transcript.

12. A computer implemented method for generating a presentation of a program operation, comprising:
    recording user interface gestures in a gesture recording and recording user interface text in a text recording while the program is operating, the user interface text including input-output text and annotation text;
    during a subsequent playback of the program, reading the gesture recording and synchronizing input to a user interface from the gesture recording with execution of the program to recreate the user interface gestures that were previously demonstrated when creating the gesture recording to control the program and cause the program to perform operations that were previously demonstrated when recording the user interface gestures;
    during the subsequent playback of the program, reading the text recording and inserting the previously recorded user interface text in a display with execution of the program;
    localizing and transforming the subsequently played back program by transforming a user interface resource into a desired local form and modifying the text recording to cause the inserted text to be compatible with the desired local form;
    generating a transformed accessibility script describing a user interface gesture of the gesture recording for a user with a disability; and
    merging the gesture recording, the text recording, the inserted user interface text, the replayed user interface gestures, the modified text recording, and the accessibility script to generate the presentation.

13. The method of claim 12, wherein the recorded user interface gestures comprise movements and activations associated with a user interface device.

14. The method of claim 13, wherein the user interface device is a computer mouse.

15. The method of claim 12, wherein the user interface text is generated by a keyboard.

16. The method of claim 12, wherein the presentation is annotated with annotation text to highlight areas of interest, the annotation text being synchronized to a plurality of time markers in the presentation.

17. The method of claim 16, wherein the annotation text is transformed to a selected format and merged with the recorded user interface gestures to generate an annotated presentation.

18. A computer program product for generating a presentation of a program operation, the computer program product comprising a computer readable non-transitory storage medium having computer readable program code embodied therewith and configured to:

record user interface gestures in a gesture recording and record user interface text in a text recording while the program is operating, the user interface text including input-output text and annotation text;

during a subsequent playback of the program, read the gesture recording and synchronize input to a user interface from the gesture recording with execution of the program to recreate the user interface gestures that were previously demonstrated when creating the gesture recording to control the program and cause the program to perform operations that were previously demonstrated when recording the user interface gestures;

during the subsequent playback of the program, reading the text recording and inserting the previously recorded user interface text in a display with execution of the program;

localize and transform the subsequently played back program by transforming a user interface resource into a desired local form and modifying the text recording to cause the inserted text to be compatible with the desired local form;

generate a transformed accessibility script describing a user interface gesture of the gesture recording for a user with a disability; and merge the gesture recording, the text recording, the inserted user interface text, the replayed user interface gestures, the modified text recording, and the accessibility script to generate the presentation.

19. The computer program product of claim 18, wherein the presentation is annotated with annotation text to highlight areas of interest, and the user interface text and annotation text are in Localization Interchange File Format (XLIFF).

20. The computer program product of claim 18, wherein the program code comprises program code configured to generate an accessibility transcript for users with disabilities.

21. The computer program product of claim 20, wherein the accessibility script comprises an audio description of visual contents.

* * * * *